United States Patent
Wu et al.

(10) Patent No.: US 11,490,384 B2
(45) Date of Patent: Nov. 1, 2022

(54) APPARATUS, METHODS, AND COMPUTER PROGRAMS

(71) Applicant: NOKIA TECHNOLOGIES OY, Espoo (FI)

(72) Inventors: Chunli Wu, Beijing (CN); Samuli Turtinen, Ii (FI); Jussi-Pekka Koskinen, Oulu (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/993,054

(22) Filed: Aug. 13, 2020

(65) Prior Publication Data
US 2021/0051656 A1 Feb. 18, 2021

(51) Int. Cl.
*H04W 72/04* (2009.01)
*H04W 52/02* (2009.01)
*H04W 72/10* (2009.01)

(52) U.S. Cl.
CPC ... *H04W 72/0446* (2013.01); *H04W 52/0216* (2013.01); *H04W 72/0413* (2013.01); *H04W 72/10* (2013.01)

(58) Field of Classification Search
CPC ......... H04W 72/0446; H04W 72/0413; H04W 52/0216; H04W 72/10; H04W 76/28; Y02D 30/70
See application file for complete search history.

(56) References Cited

U.S. PATENT DOCUMENTS

| 2015/0133061 | A1 | 5/2015 | Wu et al. |
| 2019/0239209 | A1* | 8/2019 | Zeng ................. H04W 72/0446 |
| 2020/0178172 | A1* | 6/2020 | Thangarasa ........... H04W 52/02 |
| 2021/0112495 | A1* | 4/2021 | Liang ................ H04W 52/0235 |

FOREIGN PATENT DOCUMENTS

| WO | WO 2013/102389 A1 | 7/2013 |
| WO | WO 2018/118342 A1 | 6/2018 |
| WO | WO 2018/213152 A1 | 11/2018 |
| WO | WO 2019/033017 A1 | 2/2019 |
| WO | WO 2019/034001 A1 | 2/2019 |

OTHER PUBLICATIONS

"3rd Generation Partnership Project; Technical Specification Group Radio Access Network; NR; NR and NG-RAN Overall Description; Stage 2 (Release 15)" 3GPP TS 38.300, v15.5.0 (Mar. 2019), 97 pages.

(Continued)

*Primary Examiner* — Kabir A Timory
(74) *Attorney, Agent, or Firm* — Alston & Bird LLP

(57) ABSTRACT

An apparatus comprises means for determining that there is data to be transmitted to a base station while the apparatus is configured such that a downlink channel which provides scheduling information is not being monitored for a period of time, and determining based on the data to be transmitted if the apparatus is to continue not monitoring the downlink channel for the period time or if the downlink channel is to be monitored before an end of the period of time.

17 Claims, 10 Drawing Sheets

(56) References Cited

OTHER PUBLICATIONS

"3rd Generation Partnership Project; Technical Specification Gorup Radio Access Network; NR; Medium Access Control (MAC) Protocol Specification (Release 15)" 3GPP TS 38.321, v15.5.0 (Mar. 2019), 78 pages.
"Study on UE Power Saving in NR", RP-181463, 3GPP TSG RAN Meetings #80, CATT (Jun. 2018), 5 pages.
Office Action for Taiwanese Application No. 109126738 dated May 20, 2021, 14 pages.
First Examination Report for Indian Application No. 202247012530 dated Sep. 13, 2022, 8 pages.

* cited by examiner

US 11,490,384 B2

APPARATUS, METHODS, AND COMPUTER PROGRAMS

CROSS-REFERENCE TO RELATED APPLICATIONS

This application claims priority to International Application No. PCT/CN2019/100655, filed Aug. 14, 2019, the entire contents of which are incorporated herein by reference.

FIELD OF THE DISCLOSURE

The present disclosure relates to an apparatus, methods, and computer programs and in particular but not exclusively for apparatus, methods and computer programs to be used in a communications system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communications devices.

Access to the communication system may be by means of an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus comprising means for: determining that there is data to be transmitted to a base station while the apparatus is configured such that a downlink channel which provides scheduling information is not being monitored for a period of time; and determining based on the data to be transmitted if the apparatus is to continue not monitoring the downlink channel for the period time or if the downlink channel is to be monitored before an end of the period of time.

The means may be for determining if the apparatus is to continue not monitoring the downlink channel for the period time or if the downlink channel is to be monitored before an end of the period of time in dependence on a priority of the data.

The means may be for determining if the apparatus is to continue not monitoring the downlink channel for the period time or if the downlink channel is to be decoded before an end of the period of time in dependence on if the data is transmitted.

The means may be for causing the downlink channel to be monitored an offset time period after said data has been transmitted, when it is determined that the downlink channel is to be monitored before an end of the period of time.

The means may be for causing the data to be transmitted.

The means may be for determining if the data is to be transmitted in dependence on a priority of said data.

The means may be for determining if the data is to be transmitted is in dependence on information provided by the base station for a logical channel on which said data is to be transmitted.

The means may be for causing the apparatus not to monitor the downlink channel for the period of time when the apparatus has received a go to sleep command.

The means may be for causing the apparatus not to monitor the downlink channel for the period of time when the apparatus is in a skipping mode associated with the downlink channel.

The means may be for determining the priority of said data.

The means may be for comparing the priority of said data with a threshold.

The means may be for when the priority of the data is less than the threshold determining that the apparatus is to continue to not monitor the downlink channel for the period of time.

The means may be for when the priority of the data is greater than the threshold determining that the apparatus is to monitor the downlink channel before an end of the period of time.

The means may be for causing data to be transmitted on a configured grant.

The downlink channel may be a downlink control channel.

The downlink channel may be a PDCCH.

The means may be for causing information to be transmitted to the base station indicating if the downlink channel is being decoded.

The scheduling information may comprise one or more of downlink assignments and uplink scheduling grants.

The apparatus may be provided in a user equipment. The apparatus may comprises a user equipment.

According to another aspect there is provided an apparatus comprising at least one processor and at least one memory including computer code for one or more programs, the at least one memory and the computer code configured, with the at least one processor, to cause the apparatus at least to: determine that there is data to be transmitted to a base station while the apparatus is configured such that a downlink channel which provides scheduling information is not being monitored for a period of time; and determine based on the data to be transmitted if the apparatus is to continue not monitoring the downlink channel for the period time or if the downlink channel is to be monitored before an end of the period of time.

The at least one memory and the computer code may be configured, with the at least one processor, to cause the apparatus to determine if the apparatus is to continue not monitoring the downlink channel for the period time or if the downlink channel is to be monitored before an end of the period of time in dependence on a priority of the data.

The at least one memory and the computer code may be configured, with the at least one processor, to cause the apparatus to determine if the apparatus is to continue not monitoring the downlink channel for the period time or if the downlink channel is to be decoded before an end of the period of time in dependence on if the data is transmitted.

The at least one memory and the computer code may be configured, with the at least one processor, to cause the apparatus to cause the downlink channel to be monitored an offset time period after said data has been transmitted, when it is determined that the downlink channel is to be monitored before an end of the period of time.

The at least one memory and the computer code may be configured, with the at least one processor, to cause the apparatus to cause the data to be transmitted.

The at least one memory and the computer code may be configured, with the at least one processor, to cause the apparatus to determine if the data is to be transmitted in dependence on a priority of said data.

The at least one memory and the computer code may be configured, with the at least one processor, to cause the apparatus to determine if the data is to be transmitted is in dependence on information provided by the base station for a logical channel on which said data is to be transmitted.

The at least one memory and the computer code may be configured, with the at least one processor, to cause the apparatus to cause the apparatus not to monitor the downlink channel for the period of time when the apparatus has received a go to sleep command.

The at least one memory and the computer code may be configured, with the at least one processor, to cause the apparatus to cause the apparatus not to monitor the downlink channel for the period of time when the apparatus is in a skipping mode associated with the downlink channel.

The at least one memory and the computer code may be configured, with the at least one processor, to cause the apparatus to determine the priority of said data.

The at least one memory and the computer code may be configured, with the at least one processor, to cause the apparatus to compare the priority of said data with a threshold.

The at least one memory and the computer code may be configured, with the at least one processor, to cause the apparatus to when the priority of the data is less than the threshold determine that the apparatus is to continue to not monitor the downlink channel for the period of time.

The at least one memory and the computer code may be configured, with the at least one processor, to cause the apparatus to when the priority of the data is greater than the threshold determine that the apparatus is to monitor the downlink channel before an end of the period of time.

The at least one memory and the computer code may be configured, with the at least one processor, to cause the apparatus to cause data to be transmitted on a configured grant.

The downlink channel may be a downlink control channel.

The downlink channel may be a PDCCH.

The at least one memory and the computer code may be configured, with the at least one processor, to cause the apparatus to cause information to be transmitted to the base station indicating if the downlink channel is being decoded.

The scheduling information may comprise one or more of downlink assignments and uplink scheduling grants.

The apparatus may be provided in a user equipment. The apparatus may comprises a user equipment.

According to an aspect, there is provided a method performed using an apparatus comprising: determining that there is data to be transmitted to a base station while a downlink channel which provides scheduling information is not being monitored for a period of time; and determining based on the data to be transmitted if the downlink channel is to continue to be not monitored for the period time or if the downlink channel is to be monitored before an end of the period of time.

The method may comprise determining if the apparatus is to continue not monitoring the downlink channel for the period time or if the downlink channel is to be monitored before an end of the period of time in dependence on a priority of the data.

The method may comprise determining if the apparatus is to continue not monitoring the downlink channel for the period time or if the downlink channel is to be decoded before an end of the period of time in dependence on if the data is transmitted.

The method may comprise causing the downlink channel to be monitored an offset time period after said data has been transmitted, when it is determined that the downlink channel is to be monitored before an end of the period of time.

The method may comprise causing the data to be transmitted.

The method may comprise determining if the data is to be transmitted in dependence on a priority of said data.

The method may comprise determining if the data is to be transmitted is in dependence on information provided by the base station for a logical channel on which said data is to be transmitted.

The method may comprise causing the apparatus not to monitor the downlink channel for the period of time when the apparatus has received a go to sleep command.

The method may comprise causing the apparatus not to monitor the downlink channel for the period of time when the apparatus is in a skipping mode associated with the downlink channel.

The method may comprise determining the priority of said data.

The method may comprise comparing the priority of said data with a threshold.

The method may comprise when the priority of the data is less than the threshold determining that the apparatus is to continue to not monitor the downlink channel for the period of time.

The method may comprise when the priority of the data is greater than the threshold determining that the apparatus is to monitor the downlink channel before an end of the period of time.

The method may comprise causing data to be transmitted on a configured grant.

The downlink channel may be a downlink control channel.

The downlink channel may be a PDCCH.

The method may comprise causing information to be transmitted to the base station indicating if the downlink channel is being decoded.

The scheduling information may comprise one or more of downlink assignments and uplink scheduling grants.

The method may be performed by the apparatus. The apparatus may be provided in a user equipment. The apparatus may comprises a user equipment.

According to another aspect, there is provided an apparatus comprising means for: causing information to be provided to a communications device which causes the communication device not to monitor a downlink channel which provides scheduling information for a period of time; and receiving information from the communications device indicating that said communications device is monitoring said downlink channel before the end of the period of time.

The information may comprise an uplink transmission.

The information may comprise information associated with a priority of data received from said communications device.

The information may comprise control information.

The information may be determined based on a logical channel received from said communications device.

The downlink channel may be a downlink control channel.

The downlink channel may be a PDCCH.

According to another aspect, there is provided a method performed by an apparatus comprising: causing information to be provided to a communications device which causes the communication device not to monitor a downlink channel which provides scheduling information for a period of time; and receiving information from the communications device indicating that said communications device is monitoring said downlink channel before the end of the period of time.

The information may comprise an uplink transmission.

The information may comprise information associated with a priority of data received from said communications device.

The information may comprise control information.

The information may be determined based on a logical channel received from said communications device.

The downlink channel may be a downlink control channel.

The downlink channel may be a PDCCH.

According to another aspect there is provided an apparatus comprising at least one processor and at least one memory including computer code for one or more programs, the at least one memory and the computer code configured, with the at least one processor, to cause the apparatus at least to: cause information to be provided to a communications device which causes the communication device not to monitor a downlink channel which provides scheduling information for a period of time; and receive information from the communications device indicating that said communications device is monitoring said downlink channel before the end of the period of time.

The information may comprise an uplink transmission.

The information may comprise information associated with a priority of data received from said communications device.

The information may comprise control information.

The information may be determined based on a logical channel received from said communications device.

The downlink channel may be a downlink control channel.

The downlink channel may be a PDCCH.

According to an aspect there is provided a computer program comprising computer executable code which when run on at least one processor is configured to cause any of the previously described methods to be performed.

According to an aspect there is provided a computer program comprising computer executable code which when run on at least one processor of an apparatus is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more features from one or more of the aspects described above. These combinations of features may be additional to the features combinations discussed as examples later.

Various other aspects are also described in the following detailed description and in the attached claims.

BRIEF DESCRIPTION OF FIGURES

Some embodiments will now be described in further detail, by way of example only, with reference to the following examples and accompanying drawings, in which.

DETAILED DESCRIPTION

As is known, wireless systems can be divided into cells, and are therefore often referred to as cellular systems. Typically, a base station provides at least one cell. The cellular system can support communications between user equipment (UE). The present disclosure relates to cellular radio implementation, including 2G, 3G, 4G, and 5G radio access networks (RANs); cellular interne of things (IoT) RAN; and cellular radio hardware.

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 4 to assist in understanding the technology underlying the described examples.

An example of wireless communication systems are architectures standardized by the 3rd Generation Partnership Project (3GPP). A latest 3GPP based development is often referred to as 5G. Other examples of radio access system comprise those provided by base stations of systems that are based on technologies such as wireless local area network (WLAN) and/or WiMAX (Worldwide Interoperability for Microwave Access). It should be appreciated that although some embodiments are described in the context of a 5G system, other embodiments may be provided in any other suitable system including but not limited to subsequent systems or similar protocols defined outside the 3GPP forum.

Figure 1:
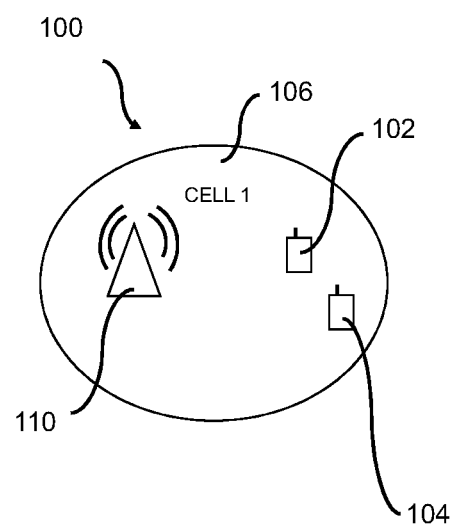
FIG. 1 shows a schematic representation of a communication system.

Reference is made to FIG. 1 which shows an example system in which some embodiments may be provided. The system may be a wireless communications. It should be appreciated that the system of FIG. 1 is a 5G system but other embodiments may be used in association with any other suitable standard or system.

FIG. 1 which shows a section of a wireless communication system 100. As can be seen a first communications device 102 and a second communications device 104 are served by Cell 1 106 which is provided by a first base station 110. The communications devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device. The communications devices have a wireless connection to a base station or other suitable access node. The base station may be any suitable base station depending on the system in which the base station is provided. For example, the base station may be a gNB or a ng-eNB.

Figure 2:
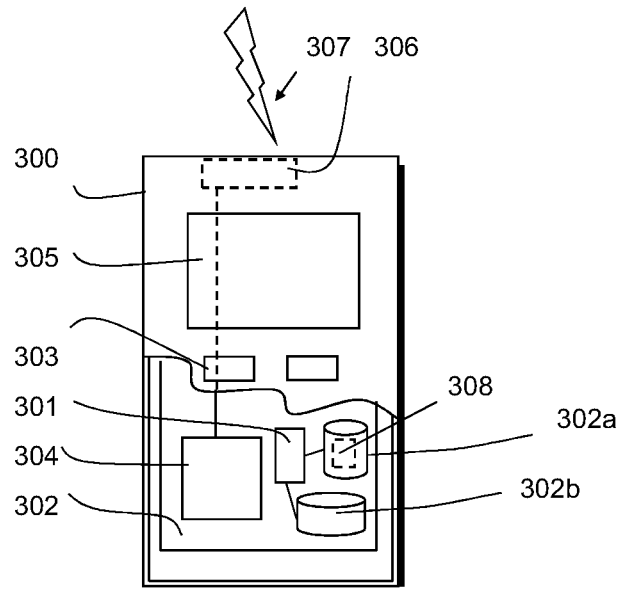
FIG. 2 shows a schematic representation of a communications device.

FIG. 2 illustrates an example of a communications device 300, such as the wireless communications device 102, or 104 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301a and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302a.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

Figure 3:
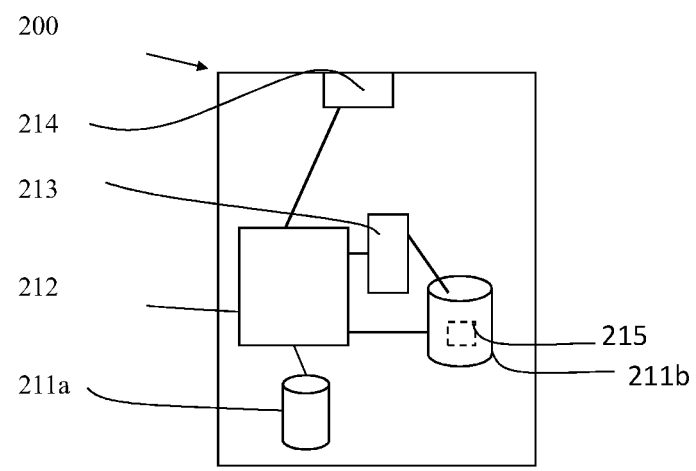
FIG. 3 shows a schematic representation of an apparatus.

An example apparatus is shown in FIG. 3. FIG. 3 shows an example of an apparatus 200 for a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
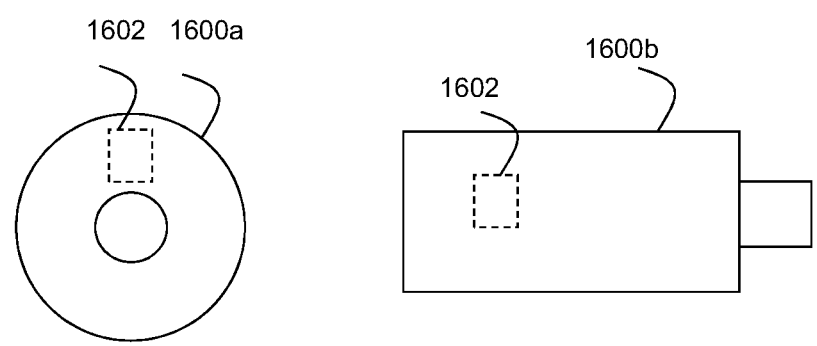
FIG. 4 shows a schematic representation of a non-volatile memory medium storing instructions which when executed by a processor allow a processor to perform one or more of the steps of the method of some embodiments.

FIG. 4 shows a schematic representation of non-volatile memory media 1600a (e.g. computer disc (CD) or digital versatile disc (DVD)) and 1200b (e.g. universal serial bus (USB) memory stick) storing instructions and/or parameters 1602 which when executed by a processor allow the processor to perform one or more of the steps of any of the methods of any of the embodiments.

One or more of the following aspects relate to a 5G system (5GS). (5G is sometimes referred to as new radio (NR)). However, it will be understood that some of these aspects may be used with any other suitable other radio access technology systems such as UTRAN (3G radio), the long-term evolution (LTE) of the Universal Mobile Telecommunications System (UMTS) and/or any other suitable system.

PDCCH (physical downlink control channel) skipping has been proposed for providing a power saving. The PDCCH may provide scheduling information for uplink and/or downlink communication. The PDCCH contains downlink control information DCI for scheduling the downlink data to be sent to the UE and/or uplink grants for the UEs that want to send uplink data. The PDCCH may indicate resource assignment for one or more UEs. The PDCCH is read by a UE so that the UE is able to upload and/or download data.

The PDCCH may be used for scheduling DL transmissions, for example on the PDSCH (physical downlink shared channel). The PDCCH may be used for scheduling UL transmissions, for example on the PUSCH (physical uplink shared channel).

The DCI on the PDCCH may comprise one or more of: downlink assignments and uplink scheduling grants. The down assignments may contain one or more of modulation and coding format, resource allocation, and hybrid-ARQ information related to DL-SCH. The uplink scheduling grants may contain one or more of at least modulation and coding format, resource allocation, and hybrid-ARQ information related to UL-SCH.

With PDCCH skipping, DCI (downlink control information) is used to indicate to the UE that the UE is to skip PDCCH monitoring. This may be for a certain period.

DRX (discontinuous reception) has been proposed to provide a power saving in communication devices. The communication device will switch its receiver off or put the receiver in a low power state for certain time periods. Both the base station and the communication device will know when the communications device is a DRX period and when the communications device is active so that the transmission of data can be scheduled appropriately.

DRX cycles may be provided that keep the UE awake periodically during an on duration. This is in case a data transmission needed. The active time of the DRX mode can be extended by scheduling the UE with an inactivity timer when there is data transmission ongoing. The inactivity timer may specify how long the UE should remain 'ON' after the reception of a PDCCH. When this timer is on the UE remains in and 'ON state' which may extend UE ON period into the period which is an 'OFF' period otherwise.

Based on scheduling decisions and/or the absence of data in the buffer, the DCI may indicate to a UE that the UE is to skip a number of PDCCH monitoring occasions.

The amount of skipping may be indicated in any suitable way. For example this may be indicated by one or more of number of monitoring occasions, time, and/or the like. The amount may be RRC (radio resource control) configured, provided by a MAC control element (MAC CE) or dynamically indicated in the DCI, or a combination thereof.

Figure 5:
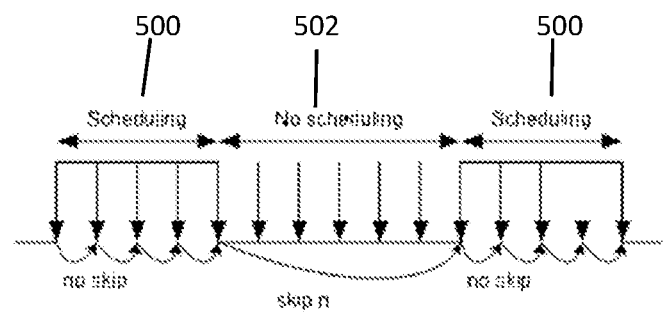
FIG. 5 illustrates skipping in a PDCCH channel.

Reference is made to FIG. 5 which illustrates a DCI-based PDCCH skipping scenario.

As can be seen the PDCCH has scheduling parts 500 and no scheduling parts 500. In the scheduling parts, there is no skipping. In the scheduling part, the PDCCH occasions is monitored by the UE. In the no scheduling part, n PDCCH occasions or a period of time are not monitored by the UE, that is those occasions are "skipped".

Some systems may use configured grant. In the uplink, the base station can dynamically allocate resources to UEs via the C-RNTI (cell radio network temporary identifier) on the PDCCH(s). A UE monitors the PDCCH(s) in order to find possible grants for uplink transmission when its downlink reception is enabled. This may be activity governed by DRX when configured.

When CA (carrier aggregation) is configured, the same C-RNTI applies to all serving cells.

With configured grants, the base station can allocate uplink resources for the initial HARQ (hybrid automatic repeat request) transmissions to the UEs.

In some systems, two types of configured uplink grants may be defined:

With Type 1, the RRC directly provides the configured uplink grant (including for example the periodicity, and/or allocated resources, and/or the like).

With Type 2, the RRC defines the periodicity of the configured uplink grant and the PDCCH addressed to CS-RNTI (configured scheduling radio network temporary identifier) may either signal and activate the configured uplink grant, or deactivate it.

A PDCCH addressed to a CS-RNTI activating the configured grant indicates that the uplink grant can be used according to the periodicity defined by the RRC, until deactivated.

The dynamically allocated uplink transmission may override the configured uplink grant in the same serving cell, if they overlap in time. Otherwise an uplink transmission according to the configured uplink grant is assumed, if activated.

Retransmissions other than repetitions may be explicitly allocated via the PDCCH(s).

When CA is configured, at most one configured uplink grant may be signalled per serving cell.

When BA (bandwidth adaption) is configured, at most one configured uplink grant can be signalled per BWP (bandwidth part) in some embodiments. In other embodiments two or more configured grants per BWP may be supported.

On each serving cell, there may be only one configured uplink grant active at a time. A configured uplink grant for one serving cell may be either Type 1 or Type 2. For Type 2, activation and deactivation of configured uplink grants are independent among the serving cells. When SUL (supplementary uplink) is configured, a configured uplink grant may only be signalled for one of the 2 ULs of the cell.

PDCCH skipping commands may be sent by the network NW from the base station based on one or more factors such as current buffer status, QoS (quality of service), cell load and/or the like. If the NW receives new data from the UE on a configured grant, it might want to schedule retransmission for that TB (transport block) right away.

If the UE is still in PDCCH skipping period, unnecessary delays may be introduced since the UE is not decoding the PDCCH for possible retransmissions. This may be problematic for the high priority/delay sensitive traffic. For delay tolerant traffic, the UE may sleep until the skipping period ends and only then decode PDCCH for possible retransmissions.

It is proposed that in some embodiments, for a CONNECTED mode UE configured with PDCCH skip function, one or more of the following rules are defined for configured grant (CG) usage and PDCCH skip.

In one embodiment, the UE always exits the PDCCH skipping period, i.e. resume PDCCH monitoring, after it initiates UL transmissions on configured grant. This may be controlled by an apparatus of the UE.

In some embodiments, there may be an offset defined after the CG transmission. This may be for example a HARQ RTT (round trip time) timer taking into account network processing time. After the offset, the UE exits the PDCCH skipping period if it is ongoing.

During/after that offset, new PDCCH skipping orders may be ignored.

Alternatively, if after that offset a PDCCH skipping order is received, UE obeys that order.

Alternatively or additionally, such exiting of the PDCCH skipping period may be based on the priority of data sent on the CG. For example, the UE wakes up to decode the PDCCH for possible re-transmission grant only if the data has high enough priority.

In some embodiments, the network can configure a LCH (logical channel) priority threshold. This threshold is used by the UE to decide if it will exit the PDCCH skipping period or not. For example if the LCH priority is higher than that of the priority threshold and/or equal to the configured threshold, the UE exits the PDCCH skipping period.

In some embodiments, the UE only builds and transmits the TB on the configured grant if it contains data of LCH with higher priority than the threshold. If not, the UE may skip the CG transmission.

Based on the PUSCH (physical uplink shared channel) detection, the base station may know the UE has exited the PDCCH skipping period and resumed PDCCH monitoring. The bases station, hence can start to schedule the UE for possible retransmissions/new transmissions.

In some embodiments, the UE may indicate in L1 UCI (layer one uplink control information) embedded within the UL transmission to the base station the highest priority data included into the transport block. The base station will determine from whether the UE will be decoding the PDCCH or not. Alternatively, this may comprise an indication if the UE will be awake or not. This may be signalled by a single bit.

It should be noted that this mechanism can be alternatively or additionally used where the UE has received a GTS (go to sleep) command. On receiving the GTS command the UE does not monitoring PDCCH (for a period). This may be indicated on by DCI (downlink control information) in L1.

Thus, such behaviour as described in relation to PDCCH skipping may be applied to when the UE has received a GTS command.

Some embodiments may provide a flexible and power efficient way to provide possible re-transmission grants for CG when PDCCH skipping and/or GTS is enforced by the network.

Some embodiments may allow a UE to be in a sleep mode where delay tolerant data is to be sent. The possible re-transmission grant may be sent later when the UE is awake according to the power saving configuration/indication.

Figure 6:
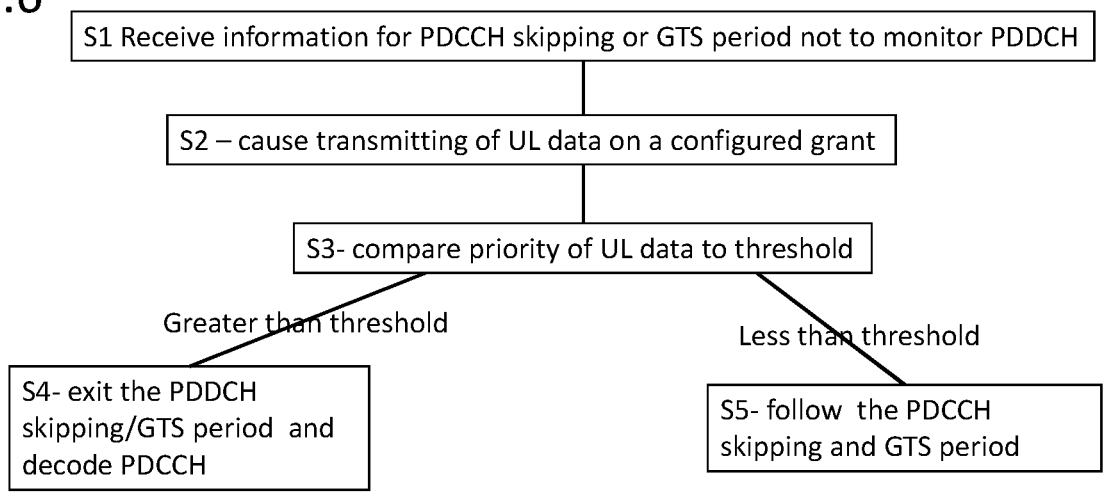
FIG. 6 shows a method of some embodiments.

Reference is made to FIG. 6 which shows some methods of some embodiments. The method may be performed by an apparatus of the communications device.

In step S1, the apparatus of the communications device receives information from the base station.

This information may be information relating to monitoring of a downlink channel with control information.

The control information may be uplink and/or downlink control information. The information may be for skipping monitoring of the downlink channel.

The information may be information relating to one or more GTS periods to not monitor the downlink channel.

The downlink channel may be a control channel.

The downlink channel may be the PDCCH.

In some embodiments, the information may instead be provided from the UE to the base station. The apparatus of the UE may be configured to cause the information to be transmitted from the UE to the base station.

In step S2, the apparatus may be configured to cause the transmitting of uplink data to the base station.

The uplink data may be transmitted on a configured grant.

The uplink data may be associated with at least one priority. Where the uplink data has different priorities, the highest priority of the uplink data may be determined. The highest priority of data multiplexed into a transport block may be determined.

In step S3, the priority of the uplink data or the highest priority of the data is compared by the apparatus to a threshold.

If it is determined if the priority of the data is associated with a greater priority than the threshold, then the next step is step S4.

In step S4, if it is determined that the priority of the data is associated with a greater priority than the threshold, then the downlink channel is monitored. The downlink channel may be decoded by the apparatus. This may mean that the apparatus causes the GTS sleep period to be exited or the skipping period to be exited.

In step S5, if it is determined that the priority of the data is associated with a lower priority than the threshold, then the downlink channel is not monitored. The apparatus causes the GTS mode to continue or the skipping period to continue, if running.

Where the priority of the data is associated with the same priority as the threshold, then the next step may be step S5 in some embodiments or step S6 in other embodiments.

Figure 7:
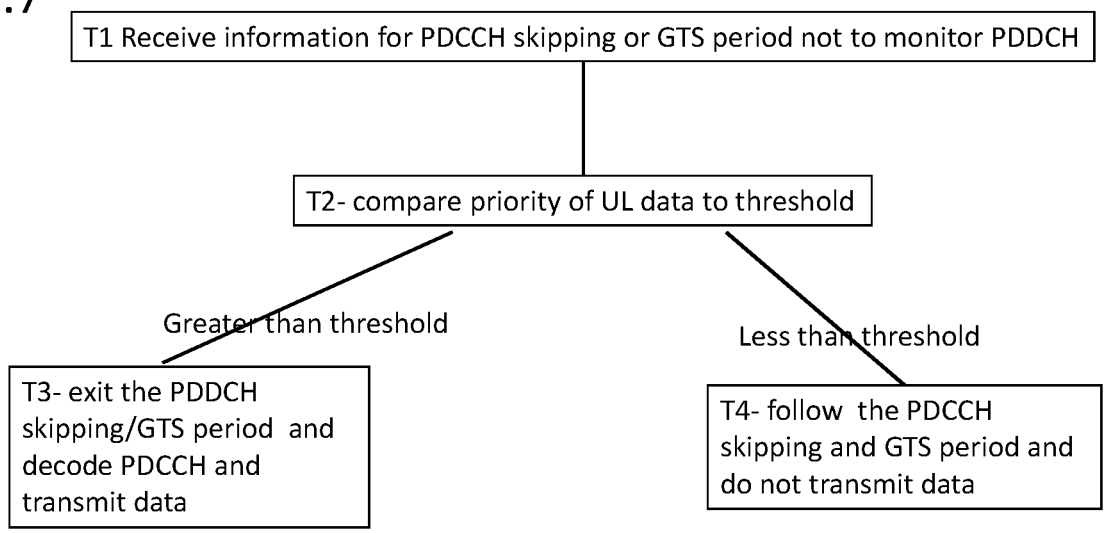
FIG. 7 shows another method of some embodiments.

Reference is made to FIG. 7 which shows some methods of some embodiments. The method may be performed by an apparatus of the communications device.

In step T1, the apparatus of the communications device receives information from the base station.

This information may be information relating to monitoring of a downlink channel with control information.

The control information may be uplink and/or downlink control information. The information may be for skipping monitoring of the downlink channel.

The information may be information relating to one or more GTS periods to not monitor the downlink channel.

The downlink channel may be a control channel.

The downlink channel may be the PDCCH.

In some embodiments, the information may instead be provided from the UE to the base station. The apparatus of the UE may be configured to cause the information to be transmitted from the UE to the base station.

In step T2, the priority of the uplink data or the highest priority of the data is compared by the apparatus to a threshold.

In some embodiments, the apparatus of the the UE will only builds and transmits the TB on the configured grant if it contains data of a LCH with higher priority than the threshold If it is determined if the priority of the data is associated with a greater priority than the threshold, then the next step is step T3.

The uplink data may be associated with at least one priority. Where the uplink data has different priorities, the highest priority of the uplink data may be determined. The highest priority of data to be or multiplexed into a transport block may be determined.

In step T3, if it is determined that the priority of the data is associated with a greater priority than the threshold, then the downlink channel is monitored. The downlink channel may be decoded by the apparatus. This may mean that the apparatus causes the GTS sleep period to be exited or the skipping period to be exited. In step T3, the apparatus is also configured to cause the transmitting of uplink data to the base station.

The uplink data may be transmitted on a configured grant.

In step T4, if it is determined that the priority of the data is associated with a lower priority than the threshold, then the downlink channel is not monitored. The apparatus causes the GTS period to continue or the skipping period to continue, if running.

Where the priority of the data is associated with the same priority as the threshold, then the next step may be step T3 in some embodiments or step T4 in other embodiments.

Figure 8:
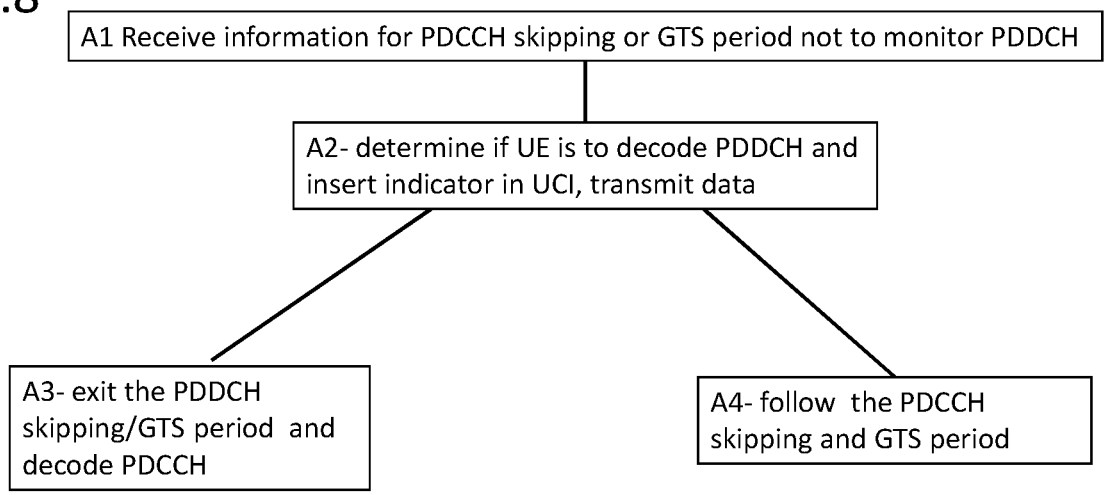
FIG. 8 shows another method of some embodiments.

Reference is made to FIG. 8 which shows some methods of some embodiments. The method may be performed by an apparatus of the communications device.

In step A1, the apparatus of the communications device receives information from the base station.

This information may be information relating to monitoring of a downlink channel with control information.

The control information may be uplink and/or downlink control information. The information may be for skipping monitoring of the downlink channel.

The information may be information relating to one or more GTS periods to not monitor the downlink channel.

The downlink channel may be a control channel.

The downlink channel may be the PDCCH.

In some embodiments, the information may instead be provided from the UE to the base station. The apparatus of the UE may be configured to cause the information to be transmitted from the UE to the base station.

In step A2, the apparatus is configured to determine when data is to be transmitted if the apparatus is to continue to not decode the downlink channel. This may be because the apparatus is in a skipping period or has received a GTS command or the like. This may be dependent on the priority of the data. This may be determined by comparing the priority of the data or the highest priority of the data to a threshold. In other embodiments, the priority of data may be assigned a value.

The apparatus is configured to transmit the data. The uplink data may be transmitted on a configured grant. The apparatus is configured to include information in the UCI which will indicate to the base station whether or not the UE is decoding the PDCCH or not. This information may be based on the priority of the data from which an apparatus at the base station will determine whether or not the UE is decoding the PDCCH or not. In other embodiments, the information may comprise an indication as to whether or not the UE is decoding the PDCCH or not. This may be a single bit which may be set to one value if the UE is decoding the PDCCH and another value if the UE is not decoding the PDCCH.

In step A3, if it is determined that the downlink channel is to be monitored, the downlink channel may be decoded by the apparatus. This may mean that the apparatus causes the GTS sleep period to be exited or the skipping period to be exited.

In step A4, if it is determined that the downlink channel is not to be monitored then the downlink channel is not monitored. The apparatus causes the GTS period to continue or the skipping period to continue, if running.

Figure 9:
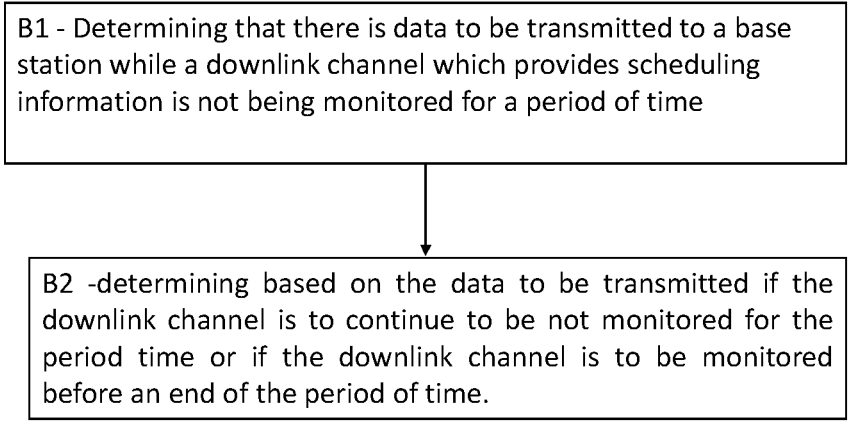
FIG. 9 shows a method of some embodiments performed by an apparatus of a communications device.

Reference is made to FIG. 9 which shows a method of some embodiments. The method may be performed using an apparatus. The apparatus may be provided by the user equipment. Thus the apparatus may be in the user equipment. The apparatus may be the user equipment. The apparatus may comprise at least one processor and at least one memory including computer code for one or more programs, the at least one memory and the computer code configured, with the at least one processor, to cause the apparatus to perform the method.

In step B1, the method comprises determining that there is data to be transmitted to a base station while a downlink channel which provides scheduling information is not being monitored for a period of time; and In step B2, the method comprises determining based on the data to be transmitted if the downlink channel is to continue to be not monitored for the period time or if the downlink channel is to be monitored before an end of the period of time.

It should be appreciated that the method may be modified to include one or more steps from one or more of the methods described previously.

Figure 10:
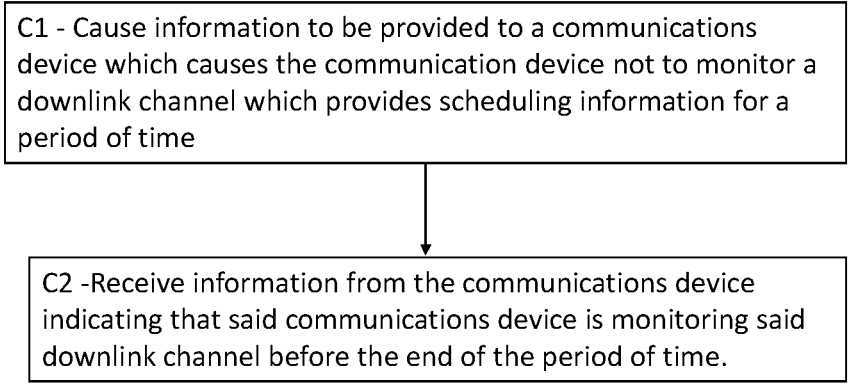
FIG. 10 shows a method of some embodiments performed by an apparatus of the base station.

Reference is made to FIG. 10 which shows a method of some embodiments. The method may be performed using an apparatus. The apparatus may be provided by the base station. Thus the apparatus may be in the base station. The apparatus may be the base station. The apparatus may comprise at least one processor and at least one memory including computer code for one or more programs, the at least one memory and the computer code configured, with the at least one processor, to cause the apparatus to perform the method.

In step C1, the method comprises causing information to be provided to a communications device which causes the communication device not to monitor a downlink channel which provides scheduling information for a period of time.

In step C2, the method comprises receiving information from the communications device indicating that said communications device is monitoring said downlink channel before the end of the period of time.

It should be appreciated that the method may be modified to include one or more steps from one or more of the methods described previously.

It is noted that while the above describes example embodiments, there are several variations and modifications which may be made to the disclosed solution without departing from the scope of the present invention. For example, the above aspects are not limited to 5GS. These aspects may be transposed to other radio access technology systems.

Reference has been made to the PDCCH. It should be appreciated that this is by way of example and other embodiments may be used with any other suitable downlink control channel which provides downlink control information.

Reference has been made to skipping of the PDCCH or the GTS command. It should be appreciated that embodiments may be used in any other suitable situation where the UE has a mode where the UE is inactive such as a sleep mode or low power mode or where the UE is commanded to enter a sleep state or low power state.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 6 to 10 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:

(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor and at least one memory including computer code for one or more programs, the at least one memory and the computer code configured, with the at least one processor, to cause the apparatus at least to:
   determine whether there is uplink data to be transmitted to a base station during a discontinuous reception, DRX, cycle while the apparatus is configured with downlink control information, DCI, based physical downlink control channel, PDCCH, skipping, wherein PDCCH monitoring is skipped for a period of time, depending on DCI;
   skip, depending on DCI, PDCCH monitoring for a period of time during the DRX cycle, in response to determining there is no uplink data to be transmitted to a base station; and
   monitor at least a first part of the period of time, in response to determining there is uplink data to be transmitted to a base station.

2. The apparatus as claimed in claim 1, wherein the at least one memory and the computer code are configured, with the at least one processor, to cause the apparatus to determine if the apparatus is to skip monitoring a downlink channel for the period of time or if the downlink channel is to be monitored for at least part of the period of time in dependence on a priority of the uplink data.

3. The apparatus as claimed in claim 1, wherein the at least one memory and the computer code are configured, with the at least one processor, to cause the apparatus to determine if the apparatus is to skip monitoring a downlink channel for the period or time or if the downlink channel is to be decoded before an end of the period of time in dependence on if the uplink data is transmitted.

4. The apparatus as claimed in claim 1, wherein PDCCH monitoring comprises decoding the PDCCH.

5. The apparatus as claimed in claim 4, wherein the offset period of time is determined by a hybrid automatic repeat request, HARQ, round-trip-time, RTT, timer.

6. The apparatus as claimed in claim 1, wherein the at least one memory and the computer code are further configured, with the at least one processor, to cause the apparatus to cause the uplink data to be transmitted.

7. The apparatus as claimed in claim 1, wherein the at least one memory and the computer code are further configured, with the at least one processor, to cause the apparatus to determine if the uplink data is to be transmitted in dependence on a priority of the uplink data.

8. The apparatus as claimed in claim 1, wherein the at least one memory and the computer code are configured, with the at least one processor, to cause the apparatus to determine that there is uplink data to be transmitted in dependence on information provided by the base station for a logical channel on which the uplink data is to be transmitted.

9. The apparatus as claimed in claim 1, wherein the at least one memory and the computer code are further configured, with the at least one processor, to cause the apparatus not to skip monitoring for the period of time when the apparatus receives a go to sleep command.

10. The apparatus as claimed in claim 1, wherein the at least one memory and the computer code are further configured, with the at least one processor, to cause the apparatus to skip monitoring for the period of time when the apparatus is in a skipping mode associated with the PDCCH.

11. The apparatus as claimed in claim 1, wherein the at least one memory and the computer code are further configured, with the at least one processor, to cause the apparatus to determine a priority of the uplink data.

12. The apparatus as claimed in claim 11, wherein the at least one memory and the computer code are further configured, with the at least one processor, to cause the apparatus to compare the priority of the uplink data with a threshold.

13. The apparatus as claimed in claim 12, wherein the at least one memory and the computer code are configured, with the at least one processor, to cause the apparatus to determine that the apparatus is to continue to not monitor the downlink channel for the period of time in an instance in which the priority of the uplink data is less than the threshold.

14. The apparatus as claimed in claim 12, wherein the at least one memory and the computer code are configured, with the at least one processor, to cause the apparatus to determine that the apparatus is to monitor at least a first part of the period of time when the priority of the uplink data is greater than the threshold.

15. The apparatus as claimed in claim 1, wherein the at least one memory and the computer code are further configured, with the at least one processor, to cause the apparatus to cause the uplink data to be transmitted based on a configured grant.

16. The apparatus as claimed in claim 1, wherein the at least one memory and the computer code are configured, with the at least one processor, to cause the apparatus to cause information to be transmitted to the base station indicating if the PDCCH is being decoded.

17. A method performed using an apparatus, the method comprises:
   determining whether there is uplink data to be transmitted to a base station during a discontinuous reception, DRX, cycle while the apparatus is configured with downlink control information, DCI, based physical downlink control channel, PDCCH, skipping, wherein PDCCH monitoring is skipped for a period of time, depending on DCI;

skipping, depending on DCI, PDCCH monitoring for a period of time during the DRX cycle, in response to determining there is no uplink data to be transmitted to a base station; and monitoring at least a first part of the period of time, in response to determining there is uplink data to be transmitted to a base station.

* * * * *

UNITED STATES PATENT AND TRADEMARK OFFICE
CERTIFICATE OF CORRECTION

PATENT NO. : 11,490,384 B2  
APPLICATION NO. : 16/993054  
DATED : November 1, 2022  
INVENTOR(S) : Chunli Wu et al.

Page 1 of 1

It is certified that error appears in the above-identified patent and that said Letters Patent is hereby corrected as shown below:

On the Title Page

In Column 1, Lines 20-21, below item (65) insert -- (30) Foreign Application Priority Data
August 14, 2019 (CN) ................ PCT/CN2019/100655 --.

Signed and Sealed this
Twentieth Day of June, 2023

Katherine Kelly Vidal
*Director of the United States Patent and Trademark Office*